United States Patent
Baudry

(10) Patent No.: US 11,158,199 B2
(45) Date of Patent: Oct. 26, 2021

(54) AIRCRAFT, AND A SYSTEM FOR SIGNALING A NON-PREPARED LANDING AREA

(71) Applicant: AIRBUS HELICOPTERS, Marignane (FR)

(72) Inventor: Jean-Pierre Baudry, Toulon (FR)

(73) Assignee: AIRBUS HELICOPTERS, Marignane (FR)

( * ) Notice: Subject to any disclaimer, the term of this patent is extended or adjusted under 35 U.S.C. 154(b) by 73 days.

(21) Appl. No.: 16/511,207

(22) Filed: Jul. 15, 2019

(65) Prior Publication Data
US 2020/0020238 A1    Jan. 16, 2020

(30) Foreign Application Priority Data
Jul. 13, 2018    (FR) ...................................... 1800740

(51) Int. Cl.
*G01C 1/00*    (2006.01)
*G08G 5/02*    (2006.01)

(52) U.S. Cl.
CPC .................................... *G08G 5/025* (2013.01)

(58) Field of Classification Search
CPC .................................... G06F 1/00; G01C 1/00
See application file for complete search history.

(56) References Cited

U.S. PATENT DOCUMENTS

| | | | |
|---|---|---|---|
| 5,289,185 A | 2/1994 | Ramier et al. | |
| 2003/0060940 A1* | 3/2003 | Humbard | G01C 23/00 701/3 |
| 2010/0156758 A1* | 6/2010 | Anders | G01C 23/005 345/8 |
| 2013/0060466 A1* | 3/2013 | Gurusamy | G01C 23/005 701/465 |
| 2015/0045994 A1* | 2/2015 | Krishna | G08G 5/065 701/3 |
| 2019/0220152 A1* | 7/2019 | Ramachandra | B64D 43/00 |

FOREIGN PATENT DOCUMENTS

| | | | |
|---|---|---|---|
| EP | 2116811 A2 | 11/2009 | |
| EP | 2116811 A3 | 8/2012 | |
| EP | 3217148 A1 * | 9/2017 | ........... G01C 23/005 |
| EP | 3217148 A1 | 9/2017 | |
| WO | 005015333 A2 | 2/2005 | |
| WO | 009081177 A2 | 7/2009 | |

OTHER PUBLICATIONS

French Search Report for French Application No. FR 1800740, Completed by the French Patent Office, dated May 29, 2019, 11 pages.

* cited by examiner

*Primary Examiner* — Shirley Lu
(74) *Attorney, Agent, or Firm* — Brooks Kushman P.C.

(57) ABSTRACT

A method of assisting piloting, which method comprises the steps of designating a landing point and determining a sighting axis. A single three-dimensional main symbol providing a conformal position of the landing point is displayed on the screen so long as it is present in a field of view along the sighting axis, the three-dimensional main symbol extending in elevation upwards from the ground from a bottom zone positioned on the ground up to a top zone positioned at a top height relative to the ground. At least while the aircraft is situated at a distance from the landing point that is less than a first threshold distance, at least one two-dimensional main symbol covering a target zone is displayed.

18 Claims, 8 Drawing Sheets

AIRCRAFT, AND A SYSTEM FOR SIGNALING A NON-PREPARED LANDING AREA

CROSS-REFERENCE TO RELATED APPLICATIONS

This application claims priority to French patent application No. FR 1800740 filed on Jul. 13, 2018, the disclosure of which is incorporated in its entirety by reference herein.

BACKGROUND OF THE INVENTION

(1) Field of the Invention

The present invention relates to an aircraft and to a system for signaling a landing area that might possibly not be prepared for landing, and in particular it relates to an aircraft having a rotary wing.

(2) Description of Related Art

During landing, the wash from a rotary wing can cause particles present on the ground to be blown up suddenly on coming close to the ground. These particles can form a cloud suddenly blinding the pilot concerning visibility of the surroundings outside the cockpit. In particular, when the aircraft is to land on a sandy, dusty (dry ground), or snow-covered zone, a cloud of sand or snow can engulf the aircraft and obscure the pilot's field of view outside the cockpit. Such a phenomenon is sometimes referred to as "brown-out" in the presence of sand and/or dirt, or "white-out" in the presence of snow.

Although pilots are prepared for this phenomenon, it can nevertheless lead to accidents. Specifically, a pilot is sometimes surprised at the moment when particles arise to obscure the pilot's field of view outside the cockpit in sudden and unexpected manner. The pilot can then lose visual references and might engage a maneuver leading to an accident of the type involving collision with the ground and/or with an obstacle. Thus, the proximity of the ground and of potential, obstacles make a poorly-controlled maneuver by the pilot dangerous.

Documents WO 2009/081177 and EP 3 217 148 describe a method of facilitating landing. The method comprises steps of determining the desired landing point as a function of a pilots line of sight, of determining the location of the landing point relative to the aircraft, of generating a display, and of updating conformal symbols referenced to the ground that give a representation of the landing zone. Those symbols comprise a single circle, a letter "H", and a plurality of cones, each cone having a base resting on the circle and disks representing various heights. For example, four cones are placed on the circle at the four cardinal points, and four other cones are placed between them. Other symbols could foe envisaged.

Although effective, too many symbols can saturate a pilot's vision.

Document WO 2005/015333 describes a system having sensors that receive information about surrounding conditions and a processor unit that, processes that information in order to assist the pilot.

Document EP 2 116 811 is remote from the invention, since it relates to an airplane guidance system.

Document U.S. Pat. No. 5,289,185 is also known.

BRIEF SUMMARY OF THE INVENTION

An object of the present invention is thus to propose a method that is relatively intuitive for assisting the pilot to visualize the position of a potentially non-prepared landing area, and to reach it, and in particular to do so in the presence of particles that obscure the pilot's field of view of the surroundings outside the cockpit.

The invention thus provides a method of assisting piloting in order to land an aircraft on a zone referred for convenience as a "target" zone. The method comprises the steps of:

designating a landing point;

determining a sighting axis with onboard calculation means;

displaying at least a part of a single three-dimensional main symbol on a screen overlaid on the real world or on a representation of the real world and in a field of view directed along said sighting axis, said three-dimensional main symbol providing a conformal position of the landing point so long as said at least part of it is in the field of view, said three-dimensional main symbol extending in elevation upwards from the ground from a bottom zone positioned on the ground up to a top zone positioned at a top height relative to the ground; and at least when the aircraft is situated at a distance from the landing point that is less than a first threshold distance, displaying on the screen at least a portion of at least one two-dimensional main symbol so long as said at least portion of it is in the field of view, said at least one two-dimensional main symbol covering said target zone.

The term "directed along said sighting axis" means that the field of view represents a space seen looking along the sighting axis. For example, the field of view represents a window centered on the sighting axis.

The term "positioned on the ground" means that the bottom zone is substantially positioned at zero height relative to the ground.

The term "distance" may refer to a straight line distance to the ground, and can thus represent a distance between the landing point and a projection onto the ground of some other point, e.g. the aircraft.

The screen may be a head-down display (screen, . . . ) or a conventional head-up display (helmet, goggles, projection onto a windshield, transparent screens, . . . ).

Under such circumstances, a target landing point is designated in the method, e.g. by a pilot using conventional means.

The onboard calculation means determine the sighting axis and generate main symbols that are attached to the landing point. When the main symbols come into the field of view, and possibly also in compliance with other criteria, the main symbols are displayed on the screen. The dimensions and/or the shapes and the elements of the symbols for display depend on the positions of the aircraft and of the sighting axis relative to the landing point.

By way of example, the real world may be displayed on the screen by means of a synthetic representation, or else it may be seen transparently through the screen.

Thus, when the landing point is designated by the pilot, or is received over a data link, for example, dedicated symbology is generated and positioned relative to the landing position overlaid conformally on the outside world.

This symbology includes conformal three-dimensional symbology including the three-dimensional main symbol. The three-dimensional main symbol is displayed after the landing point has been designated in order to show where the landing point is located relative to the aircraft.

Furthermore, when the aircraft is situated at a distance from the landing point that is less than a first threshold distance, the calculation means cause conformal two-dimensional symbology to be displayed including a two-dimensional main symbol. This two-dimensional symbology may cover a landing zone having an area of the same order as the area of a conventional heliport, and/or it may be displayed progressively.

The two-dimensional symbology enables a pilot to determine easily and visually any offset (e.g. due to unexpected lateral drift) relative to the landing point. The three-dimensional symbology serves to evaluate accurately the position of the landing point, and may also enable the pilot to evaluate visually the height and the roll angle of the aircraft.

The pilot remains free to land the aircraft wherever desired. Nevertheless, if a cloud of particles forms close to the ground, the pilot is assisted in natural manner by displayed symbols that serve to give the pilot conformal information that is necessary and sufficient for the purpose of landing, i.e. the position of the selected landing zone relative to the aircraft, and also graphic information concerning the aircraft height above the ground and its roll angle. This information can be used regardless of visibility conditions, and in particular in the event of visibility being degraded suddenly and unexpectedly.

The method serves to provide the pilot with information in intuitive form, thereby providing the pilot with optimized understanding of the situation and/or the positioning of the aircraft relative to the designated landing point. It is then up to the pilot to perform the maneuver that seems most appropriate.

The piloting assistance method may thus be a method that does not impose any constraint concerning landing, and for example it need not include a step of displaying "flight director" information that is to be followed by the pilot.

Using a set of symbols that are displayed in succession and that include a single three-dimensional main symbol and two-dimensional main symbols can then lead to symbology that is clean, that does not mask the outside surroundings, and that is easily understood by a pilot during a stage that might potentially give rise to anxiety.

The method may also include one or more of the following characteristics.

In an aspect, the method may include a step of determining a line of sight of a pilot of said aircraft by means of a posture detector, in particular for detecting movements of the pilot's head, said sighting axis coinciding with said line of sight.

By way of example, this characteristic makes it possible to use a screen arranged on a helmet and to position the landing point relative to the pilot's field of view.

Alternatively, the sighting axis may correspond to an axis of the aircraft, e.g. an axis positioned along the speed vector of the aircraft.

In an aspect, the three-dimensional main symbol may comprise an upside-down cone, said main cone extending upwards from a tip of the main cone forming the bottom zone up to a base forming the top zone.

This upside-down cone shape serves to specify the landing point accurately.

The top zone may cover an area that varies as a function of the accuracy of a system, e.g. a system for locating the position of the aircraft in three-dimensional space.

In an aspect, said height may be equal to a predetermined height or to the height of the aircraft at the time the landing point is designated.

In an example, the predetermined height may correspond to a specified height from which the aircraft is to perform hovering flight prior to landing.

In another example, the top zone of the three-dimensional main symbol may be placed at the height that was occupied by the aircraft at the time it designated the landing point by overflying it.

In an aspect, said at least one two-dimensional main symbol may comprise at least three closed main lines that are nested in one another, the at least three main lines each being centered on the landing point and being positioned at ground altitude, said at least one two-dimensional main symbol including at least four main segments converging on said landing point.

The term "nested in one another" means that each line surrounds another line and/or is surrounded by another line. Under such circumstances, a second line is surrounded by a first line and surrounds a third line.

The lines may be located in a common plane lying substantially on the ground.

This two-dimensional symbology enables a pilot to visualize where the landing point is located relative to the pilot, in particular when the landing point is no longer visible in the pilot's field of view.

In an example, each main line represents a circle, and each main segment extends along a radius of the circle.

Optionally, the main segments are uniformly distributed angularly around the landing point. For example, the symbology may comprise four main segments distributed at 90° intervals, six main segments distributed at 60° intervals, . . .

The circles present a shape that converges on the landing point, as do the main segments.

The closed lines and the various segments may present dimensions that are constant. For example, when a circle is present, each circle may present a predetermined diameter, possibly as a function of the diameter of a rotor of the aircraft.

In an aspect, each main segment may extend from a first end to a second end, the first end being positioned on the sole main line that is not surrounded by another main line, the second end not reaching the landing point, a main symbol having a central shape that is optionally H-shaped and that is positioned on the landing point between the second ends of the main segments.

Optionally, the central H-shape may be directed along the arrival axis of an approach path. The H is positioned at the landing point, and may be centered on the landing point, and it is oriented along the arrival axis as determined by said onboard calculation means in order to show the orientation of the arrival axis. Such an H-shape then comprises two "vertical" bars connected together by a "horizontal" bar, the horizontal bar being substantially perpendicular to a projection of said arrival axis on the ground, and the vertical bars being substantially parallel, to that projection.

In an aspect, said three-dimensional main symbol may include a height mark that is movable as a function of the current height of the aircraft, the current height mark being positioned at the current, height of the aircraft between the bottom zone and the top zone so long as the current height of the aircraft is less than the top height.

In an aspect, at all times, said three-dimensional main symbol may include a height mark that is movable as a function of the current height of the aircraft, the current height mark being positioned at the current height of the aircraft between the bottom zone and the top zone so long as the current height of the aircraft is less than the top height, the height mark being positioned at the level of the top zone of the three-dimensional main symbol so long as the aircraft is at a height that is greater than or equal to the top height.

For example, a mark slides within the three-dimensional main symbol to inform a pilot about the height of the aircraft. By way of example, this mark may be in the form of a sliding ring.

In an aspect, when said bottom zone of the three-dimensional main symbol no longer appears in the field of view and at least when the aircraft is situated at a distance from the landing point that is less than a second threshold distance, the method may include a step of displaying a three-dimensional secondary symbol on said screen and on said sighting axis, which three-dimensional secondary symbol is not overlaid on the landing point and extends upwards from the ground with a graphic appearance that is visually different from the graphic appearance of the three-dimensional main symbol, the secondary symbol presenting a mark that is movable as a function of the height of the aircraft.

For example, the secondary symbol has the same shape as the three-dimensional main symbol and it is always displayed in the pilot's sight axis. In contrast, these two symbols are visually different. Thus, the secondary symbol may be in the shape of an upside-down secondary cone drawn using lines that are discontinuous or dotted, while the three-dimensional main symbol is in the form of an upside-down cone drawn with continuous lines.

For example, each cone becomes larger when the aircraft approaches the ground.

The secondary symbol then provides the pilot with visual information concerning the height and the roll angle of the aircraft.

In an aspect, when each main symbol no longer appears in the field of view and at least when the aircraft is situated at a distance from the landing point that is less than a second threshold distance, said second threshold distance being less than the first threshold distance, the method may include a step of displaying at least one section of at least three closed secondary lines centered on the landing point and at least one secondary segment with a graphic appearance that is visually different from the graphic appearances respectively of the main lines and of the main segments of said at least, one two-dimensional main symbol, the ac least three secondary lines being positioned at ground altitude around the main lines of each secondary segment converging on the landing point.

The dimensions of the main symbols are constant. When the aircraft is situated substantially vertically above the landing point, and starting from a certain height for the aircraft, the main symbols disappear from the pilot's field of view.

As a result, secondary symbols that are distinct from the main symbols may appear so that the pilot knows where the aircraft is located in three-dimensional space.

Optionally, each secondary segment is in alignment with a main segment.

Optionally, the main symbols are drawn with continuous lines, and the secondary symbols with discontinuous lines, or indeed dotted lines.

In an aspect, when each main symbol does not appear in the field of view, the method may include a step of displaying an arrow on the screen, the arrow pointing towards the landing point, e.g. being located in the margin of the pilot's current field of view.

The onboard calculation means can determine the direction to the landing point relative to the sighting axis and can cause an arrow to be displayed that is positioned pointing in that direction.

In an aspect, the method may include a step of displaying ac least one mark illustrating a roll angle of the aircraft, said mark being in a predetermined position when said aircraft is not banked.

Such a mark may be the height mark of a two-dimensional main symbol or of a secondary symbol.

For example, the mark showing the height of the aircraft in the three-dimensional main symbol may be horizontal in the reference frame of the aircraft when the aircraft is not banked, and it may be inclined in the presence of a non-zero roll angle.

In an aspect, the method may comprise the steps of:

using the onboard calculation means to determine an approach slope directed towards the landing point or the top zone of the three-dimensional main symbol; and displaying each section present in the field of view of at least two passing gates, each centered on said slope and each representing a gate through which the aircraft can pass in order to reach the landing point by following said slope, each gate being tangential to a cylinder centered on the landing point, the gate among said at least two passing gates that is tangential to the first cylinder encountered on going from the aircraft towards the landing point being an active gate, and the other gates among said at least two passing gates being inactive gates, said active gate having a visual appearance that is different from said inactive gates.

In order to reach the landing point, and on receiving a request from a pilot, the calculation means can establish a path following a particular slope and directed along the above-mentioned arrival axis. For example, the arrival axis may be directed to face the wind so as to connect the aircraft to the landing point, or indeed it may be determined by the pilot, . . . . The slope may be predetermined, or it may be established so as to reach the landing point when starting from the aircraft, or it may be set by the pilot, . . . .

Under such circumstances, the onboard calculation means generate at least two passing symbols representing gates, and for example three squares each centered on said slope. The size of the side of each square may for example correspond to 1.5 times the size of the main rotor if the aircraft is a helicopter.

The pilot can repeat this operation as often as desired, with a joining path being calculated on each occasion automatically and replacing the preceding joining path.

Optionally, the gates are provided for assistance only. The pilot is not required to pass through them, and no warning is generated if the pilot does not pass through one or more gates.

In an aspect, the method may include a step of displaying a movement symbol on said screen so long as the aircraft presents an air speed greater than a predetermined threshold, the movement symbol representing the speed vector of the aircraft.

In order to follow the suggested slope, the pilot merely needs to pilot the aircraft so that the movement symbol is positioned in the gates.

In addition to a method, the invention also provides an aircraft provided with a screen and onboard calculation means, the onboard calculation means being configured to apply the method.

BRIEF DESCRIPTION OF THE DRAWINGS

The invention and its advantages appear in greater detail in the context of the following description of embodiments given with by way of illustration and with reference to the accompanying figures, in which.

DETAILED DESCRIPTION OF THE INVENTION

Elements shown in more than one of the figures are given the same references in each of them.

Figure 1:
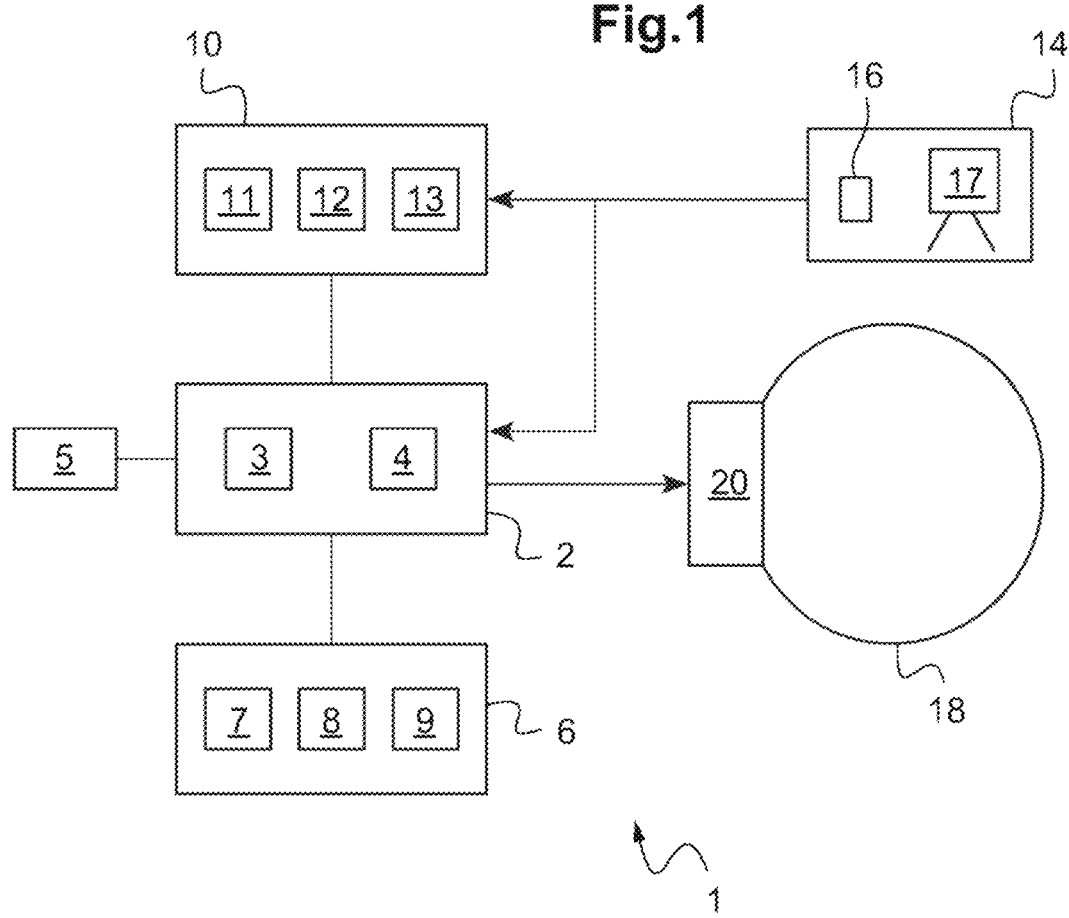
FIG. 1 is a diagram showing an aircraft of the invention.

FIG. 1 shows an aircraft 1 of the invention configured to be able to apply the method of the invention. The aircraft 1 may in particular be an aircraft suitable for landing on a zone of small area. In particular, the aircraft may be a rotorcraft. The aircraft may have at least one rotary wing. The aircraft could include jets enabling it to land vertically or substantially vertically.

The aircraft 1 includes onboard calculation means 2. The onboard calculation means 2 may comprise one or more computers, one or more electronics cards, . . . . By way of example, the onboard calculation means 2 may comprise at least one processor 3 and at least one memory 4, at least one integrated circuit, at least one programmable system, at least one logic circuit, these examples not limiting the scope to be given to the term "onboard calculation means".

The onboard calculation means 2 may communicate via a wired or wireless link with a position sensor 6. Such a position sensor 6 sends information to the onboard calculation means 2 concerning the position of the aircraft 1 in three-dimensional space, e.g. relative to a terrestrial reference frame and/or to a landing zone, . . . . For example, such a position sensor may comprise a satellite positioning system 7 and/or a radio altimeter 8 and/or a radar or the equivalent and/or an optical system and/or an inertial unit, . . . .

The onboard calculation means 2 can communicate via a wired or wireless link with a speed sensor 5 in order to obtain information about a speed of the aircraft or indeed to determine the speed vector of the aircraft. Such a speed sensor 5 may comprise a satellite positioning system of the position sensor, an air data computer (ADC), an inertial unit, . . . .

Furthermore, the onboard calculation means 2 may communicate over a wired or wireless link with a position designator 10 suitable for designating a landing point. In general manner, the position designator may comprise any member suitable for obtaining the coordinates of a landing point.

By way of example, such a position designator 10 may comprise an onboard member 11 that can be operated by a pilot, such as a button or the equivalent, enabling a pilot to designate a landing point by passing over that landing point, or indeed to designate the landing point on a map tool via a man/machine interface including touch-sensitive, visual, gesture, or other means. The position designator may comprise an onboard member 12 operable by a pilot to input characters, such as a keyboard or a mouse, for example, enabling coordinates of the landing point to be input numerically. The position designator may comprise a data receiver 13 suitable for receiving the coordinates of the landing point as transmitted by a third party using a remote transmitter, e.g. a third party present on the ground or in another aircraft. In other examples, the position designator 10 may comprise a laser system, an eye-tracker system for tracking a pilot's line of sight, . . . .

Furthermore, the aircraft may include a conventional posture detector 14 for determining a pilot's line of sight. By way of example, the posture detector 14 may comprise at least one camera 17 and an image processor 16. The posture detector 14 may serve in particular as a designator and can transmit information about the line of sight to the onboard calculation means. In a variant, the onboard calculation means determine the line of sight from a posture as transmitted by the image processor, or the posture detector transmits the coordinates of the line of sight to the onboard calculation means.

Furthermore, the aircraft has at least one screen 20 displaying symbology of a particular technical nature for showing the position of the target landing point. Such a screen 20 may be a head-up display, e.g. of the type forming part of a helmet 18 worn by a pilot, or it may comprise retina projection means, or windshield projection means. The screen may be transparent so as to display technical data overlaid on the real world.

Figure 2:
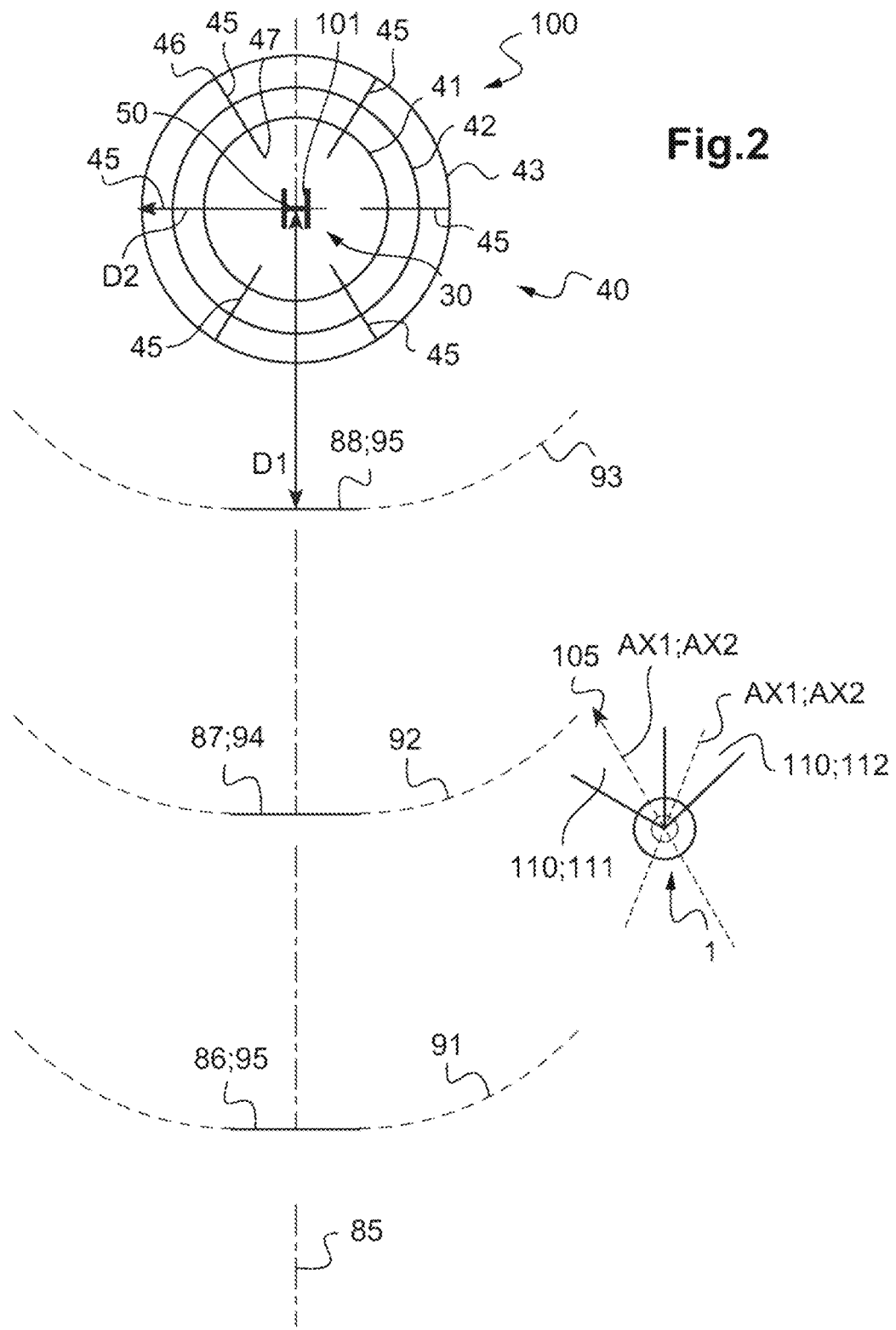
FIG. 2 is a view showing various symbols that can be displayed on a screen of the invention.

With reference to FIG. 2, the onboard calculation means 2 determine the positions of main symbols 30, 40 in three-dimensional space, and possibly also of secondary symbols that are not shown in FIG. 2, and possibly also passing gates 86, 87, 88.

The main symbols 30, 40 may comprise a single three-dimensional main symbol 30 marking a position coinciding with the landing point 101, and thus a single three-dimensional main symbol 30 presenting a point located at the landing point 101.

Furthermore, the main symbols 30, 40 may comprise at least one two-dimensional main symbol 40 representing the target zone 100 for a landing.

Thus, two-dimensional main symbols 40 may be in the form of at least two or even at least three main lines 41, 42, 43 that are closed and nested in one another. Each main line 41, 42, 43 may form a circle, and the circles may be concentric. In another example, each main line 41, 42, 43 may form a polygon, . . . .

In addition, each main line 41, 42, 43 may be centered on the landing point 101 and positioned at the same altitude as the ground. As a result, each line does indeed form a two-dimensional pattern.

In addition, or as an alternative, two-dimensional main symbols 40 may be in the form of at least four main segments 45 all converging on the landing point 101.

Optionally, the main segments and the main lines are present in a common plane. In addition, each main segment 45 extends from a first end 46 to a second end 47. The first end 46 is optionally positioned on the single main line 43 that is not surrounded by another main line 41, 42. Optionally, the second end 47 need not reach the landing point 101.

In an embodiment described below, the main lines form concentric circles, with the main segments extending radially towards the landing points from the circle of largest diameter.

Furthermore, another two-dimensional main symbol 40 may draw the outlines of a central shape 50, e.g. an H-shape, an X-shape, . . . . This central shape is positioned on the landing point 101 and optionally between the second ends 47 of the main segments 45.

By way of example, depending on the position of the aircraft or on the angle of inclination of the pilot's head, the various symbols may be displayed on a screen 20 in full or in part, being overlaid on the real world if the screen is transparent or being overlaid on a representation of the real world.

Furthermore, the onboard calculation means may optionally calculate the coordinates of passing gates 86, 87, 88 that mark a possible path for reaching the landing point 101. The onboard calculation means may optionally calculate the coordinates of at least two passing gates 86, 87, 88, e.g. at least two or three passing gates. Optionally, the passing gates may be parallel to one another.

Each passing gate may be tangential to a cylinder centered on the landing point 101. Each cylinder may present a radius equal to a predetermined distance multiplied by an integer. For example, the first passing gate 86 is tangential to a cylinder 91 presenting a radius equal to three times the predetermined distance, the second passing gate 87 is tangential to another cylinder 92 presenting a radius equal to twice the predetermined distance, and a third passing gate 88 is tangential to another cylinder 93 presenting a radius equal to the predetermined distance.

In addition, the passing gate that is tangential to the first cylinder that is to be met on the aircraft going towards the landing point is an active gate 94, while the other gates are inactive gates 96. In the example of FIG. 2, the second gate 87 is an active gate 94.

The active gate 94 may have a visual appearance that is different from the inactive gate 95. For example, the active gate may be drawn with bolder lines and/or lines of a color that is different from the inactive gates.

Under such circumstances, the onboard calculation means determine a sighting axis AX1 and a field of view 110 in alignment on the sighting axis. The onboard calculation means then transmit a signal to the screen in order to display the optional part of the three-dimensional main symbol present in the field of view by giving it the shape it would have as seen looking along the sighting axis, the optional portions of two-dimensional main symbols present in the field of view by giving them the shapes they would have as seen looking along the sighted axis, and the optional segment of each passing gate present in the field of view by giving it the shape it would have as seen looking along the sighting axis.

In a variant, the sighting axis AX1 may coincide with a travel axis AX2 aligned on the speed vector 105 of the aircraft, the field of view then being the field of view 110 containing the sighting axis. Only elements present in this field of view are displayed. The first gate and the second gate in particular are not displayed.

In another variant, the sighting axis AX1 may coincide with the line of sight AX3 of the pilot, the field of view then corresponding to the field of view 112 of the pilot. In the example of FIG. 2, no main symbol and no gate are then displayed.

FIGS. 3 to 15 show the method of the invention by showing the information that is displayed on the screen 20.

Figure 3:
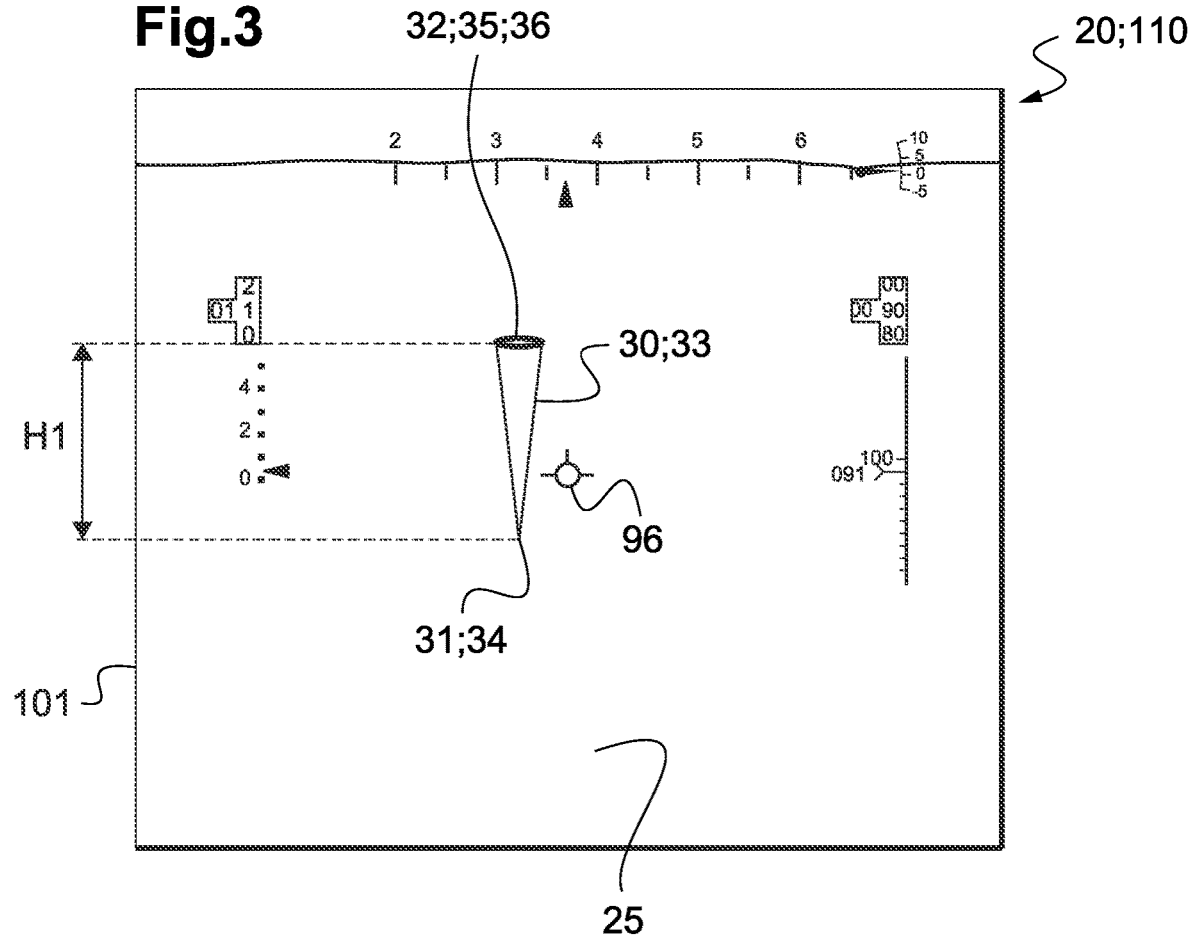
FIGS. 3 to 14 are views showing the method of the invention by means of technical information displayed on a screen.

With reference to FIG. 3, the method has a step of designating the landing point by using the position designator 10. The landing point may be set by the pilot or it may be transmitted to the aircraft from outside the aircraft.

The onboard calculation means estimate the sighting axis and display each part of the main symbol 30 that is contained in the field of view 110 on the screen 20, overlaid on the real world or on a representation of the real world. Once the landing point is confirmed, dedicated symbology appears on the screen at the validated position overlaid on the outside world in order to show where the landing point is located and possibly also to provide an indication concerning the height and roll angle of the aircraft.

To this end, the three-dimensional main symbol 30 extends upwards in elevation from the ground 25 from a bottom zone 31 resting on the ground 25 to a top zone 32 positioned at a top height H1 above the ground 25.

The bottom zone 31 may be no more than a point positioned at the landing point 101.

The surface area of the top zone 32 may be calculated by the onboard calculation means as a function of the accuracy of the satellite locating system, for example. The top zone 32 may be positioned at a top height H1 above the ground. This top height H1 may be constant throughout the approach, being equal to a predetermined height, or it may be equal to the height of the aircraft at the moment when the landing point 101 is designated.

By way of example, the three-dimensional main symbol 30 is an upside-down main cone 33. Under such circumstances, the main cone 33 extends upwards from an apex 34 of the main cone 33 forming the bottom zone 31, to a base 35 forming the top zone 32.

The three-dimensional main symbol 30 is displayed in compliance with a first graphic charter. This first graphic charter may consist in using fine continuous lines only.

Furthermore, at each instant, the three-dimensional main symbol 30 may include a height mark 36 that is movable as a function of the height of the aircraft 1. When the three-dimensional main symbol 30 is in the shape of a cone on a circular base, the height mark is in the form of a circle and corresponds to the intersection between the cone and a plane parallel to the base.

The height mark is displayed in compliance with a second graphic charter that is different from the first graphic charter. By way of example, the second graphic charter may consist in using only bold continuous lines so as to clearly distinguish the height mark from the other marks of the three-dimensional main symbol 30.

Furthermore, the onboard calculation means position the height mark 36 between the bottom zone 31 and the top zone 32 and at the current height of the aircraft so long as the current height of the aircraft is lower than the top height H1. In contrast, and as shown in FIG. 3, the height mark 36 is positioned level with the top zone 32 of the three-dimensional main symbol 30 so long as the height of the aircraft is higher than or equal to the top height H1.

Under such circumstances, the three-dimensional main symbol 30 and the height mark act, regardless of visibility conditions, not only to provide the conformal position of the landing point that is to be reached, but also to provide information about the height of the aircraft above the ground, or indeed information about the attitude of the aircraft relative to the ground, as described below.

Furthermore, the onboard calculation means can determine the orientation of the speed vector of the aircraft by conventional methods. During a display step, the onboard calculation means may control the screen 20 so that it displays a movement symbol 96 representing the speed vector, at least so long as the aircraft presents an air speed greater than a predetermined threshold. At low speed, i.e. lower than the predetermined threshold, calculating air speed can be relatively inaccurate. Consequently, this characteristic consists in not displaying a symbol representing an inaccurate speed vector in order to limit the amount of information displayed and in order to make the pilot's analysis work easier.

Furthermore, the screen may be controlled to display conventional data, such as a heading, an air speed, . . . .

Figure 4:
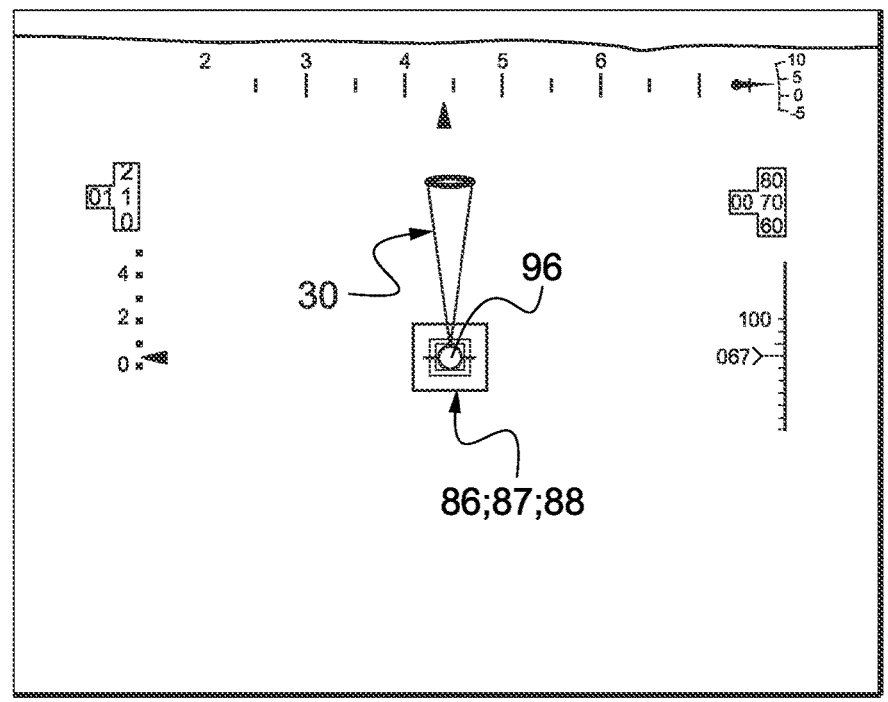

With reference to FIG. 4, the pilot can pilot the aircraft so as to position it, generally facing the wind, at the position where the pilot seeks to begin descent to the designated landing point. After a starting point has been validated by operating a manual or voice or touch-sensitive or other control, the onboard calculation means calculates a slope for a path referred to for convenience as a "joining" path for reaching the landing point, or where appropriate the top zone of the three-dimensional main symbol 30. The pilot can renew this step several times over, with a new joining path being calculated on each occasion. Optionally, the pilot does not have to follow the joining path, with the joining path being shown by way of information only in order to assist the pilot, if necessary.

By way of example, the calculation means may calculate the slope of a straight line connecting the aircraft to the landing point, or it may use a stored slope, or it may use a slope angle set by the pilot.

Under such circumstances, the onboard calculation means calculate the positions of at least two passing gates 86, 87, 88, and in particular of three passing gates in this example. These passing gates 86, 87, and 88 are given by way of indication. Optionally, no warning is generated if one or more passing gates are not passed through.

Each passing gate may be positioned as a function of a scored distance lying horizontally between the passing gate and the landing point, and it may be centered on the calculated slope, for example. Under such circumstances, the calculation means may transmit a signal to the screen to cause it to display each section of the passing gate that is present in the field of view 110.

During a nominal approach stage following the calculated path, the three passing gates are nested in one another.

If the pilot seeks to follow this path easily, the aircraft needs to be piloted so that the movement symbol 96 is positioned in the active gate.

Figure 5:
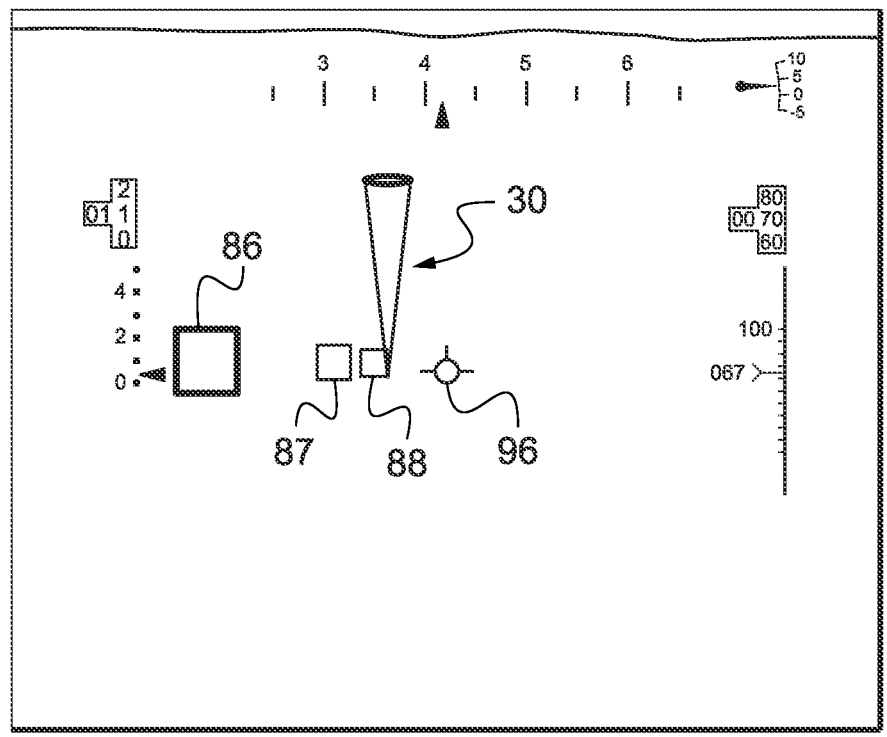

With reference to FIG. 5, the shapes of the various symbols displayed, and in particular of the passing gates are recalculated as a function of the relative positioning of the sighting axis and of the symbols.

Figure 6:
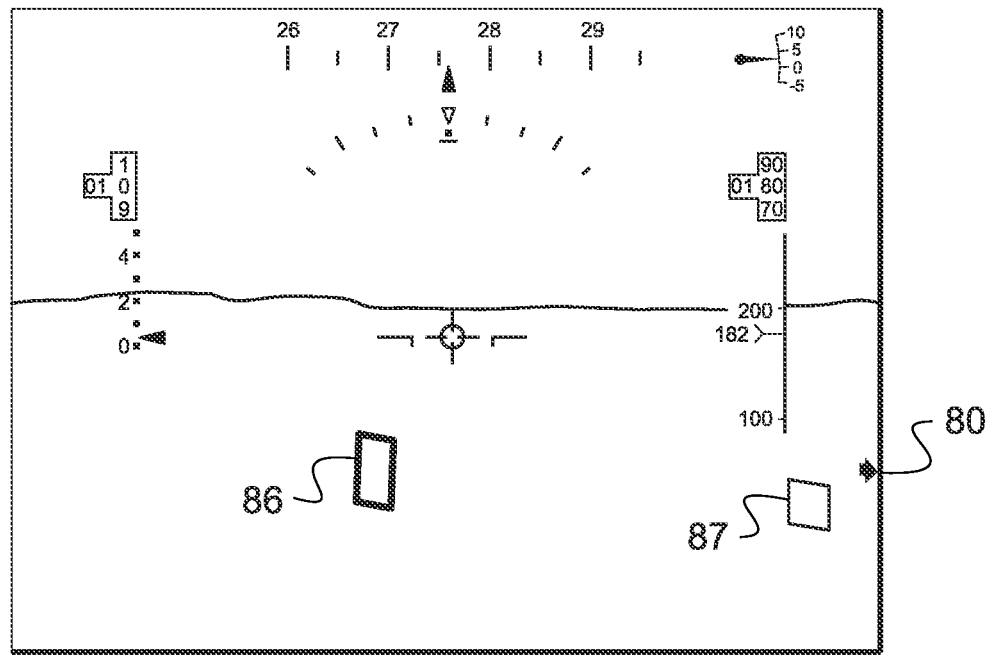

With reference to FIG. 6, if the landing point does not lie in the field of view, or indeed if all of the two or three-dimensional main symbols do not lie in the field of view, the onboard calculation means can calculate a direction leading to the landing point and can transmit a signal to the screen in order to display an arrow 80 pointing towards the landing point 101.

Figure 7:
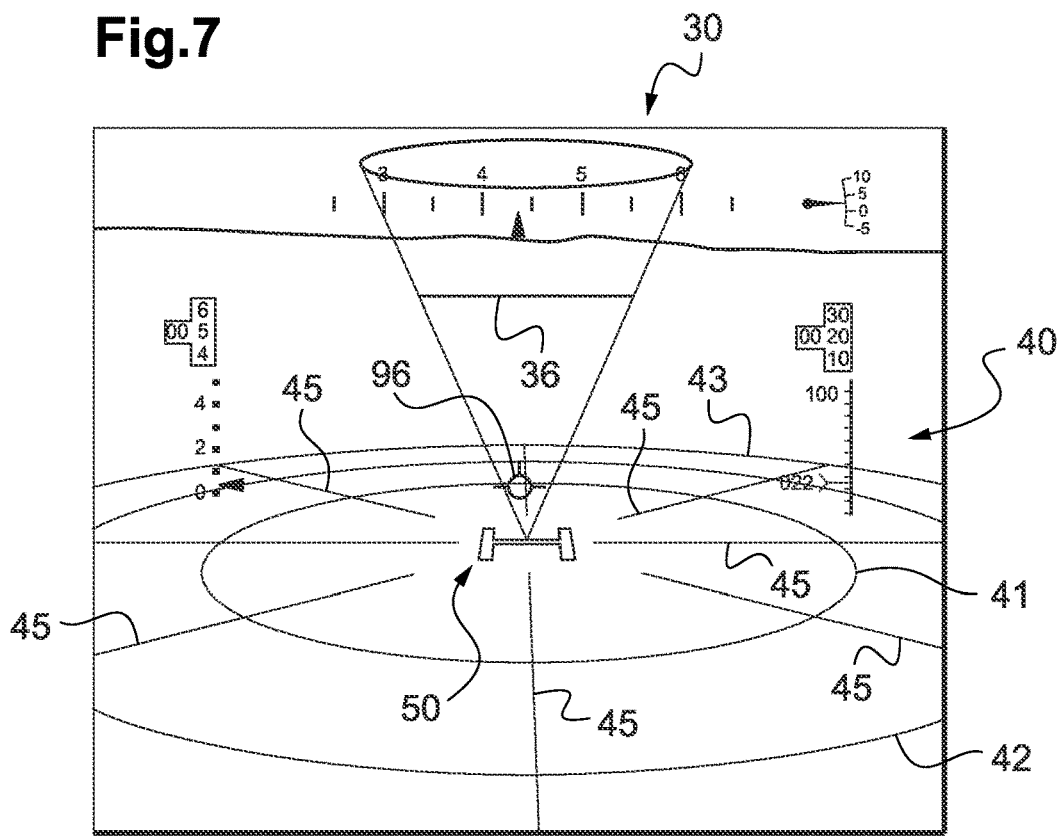

With reference to FIG. 7, at least when the aircraft 1 is situated at a distance from the landing point 101 that is less than a first threshold distance D1, the onboard calculation means calculate the positions of the two-dimensional main symbols 40 and transmit a signal to the screen in order to display on the screen 20 each portion of the two-dimensional main symbols 40 that is present in the field of view 110.

By way of example, the first threshold distance D1 may be a stored constant distance, a distance that is a function of the dimensions of the rotor disk of the rotorcraft, the distance between the landing point and the nearest passing gate, . . . .

Optionally, the two-dimensional main symbols 40 appear progressively, by being faded in.

Where appropriate, the central shape 50 may be directed along the approach axis of the theoretical slope.

In addition, FIG. 7 shows the fact that the height mark 36 moves in the three-dimensional main symbol, so as to come closer to the landing point as the aircraft comes closer to the ground. In addition, the orientation of the central H-shape 50 provides the pilot with the orientation of the arrival axis as predetermined by the calculation means. In FIG. 7, the current axis is correct.

If a cloud of particles is formed, the information displayed enables the pilot to know exactly and easily where the aircraft is located relative to the selected landing point.

Figure 8:
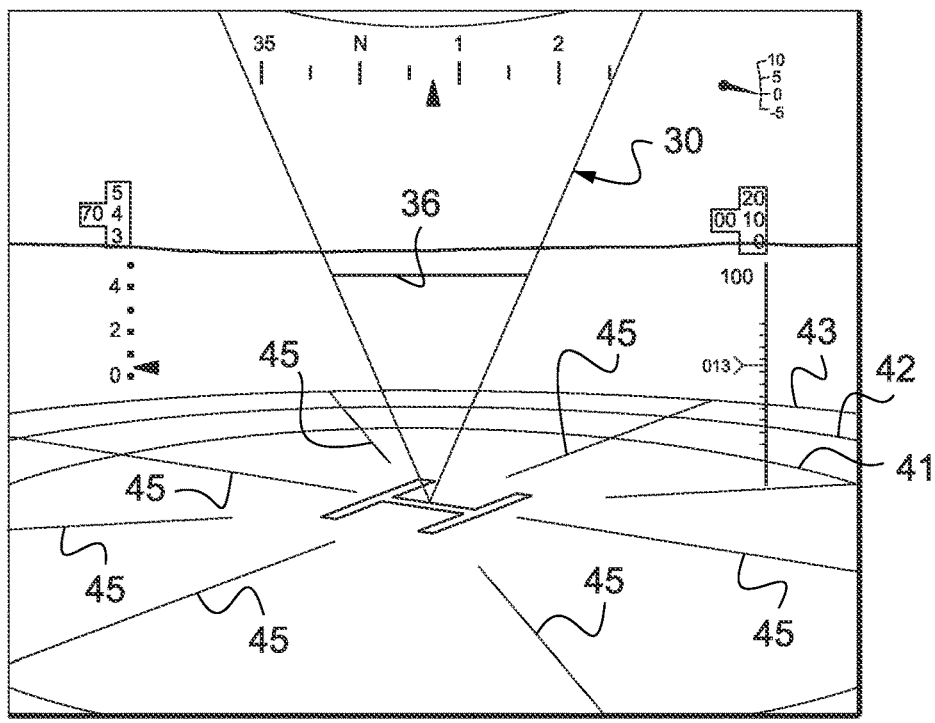

With reference to FIG. 3, the pilot reduces the travel speed of the aircraft in the proximity of the ground. Under such circumstances, the movement symbol 96 that is still visible in FIG. 7 disappears. Very close to landing, piloting may be performed solely by means of the displayed symbols marked artificially in overlay on the real world or on a representation of the real world, these symbols moving and being modified in compliance with the position of the aircraft relative to the landing point. Furthermore, as shown in FIG. 8, the central H-shape 50 is turned to the left. The pilot can deduce that the approach axis of the aircraft is poorly positioned relative to the arrival axis as predetermined by the calculation means. It is then up to the pilot to make a correction, if the pilot judges that to be appropriate.

Figure 9:
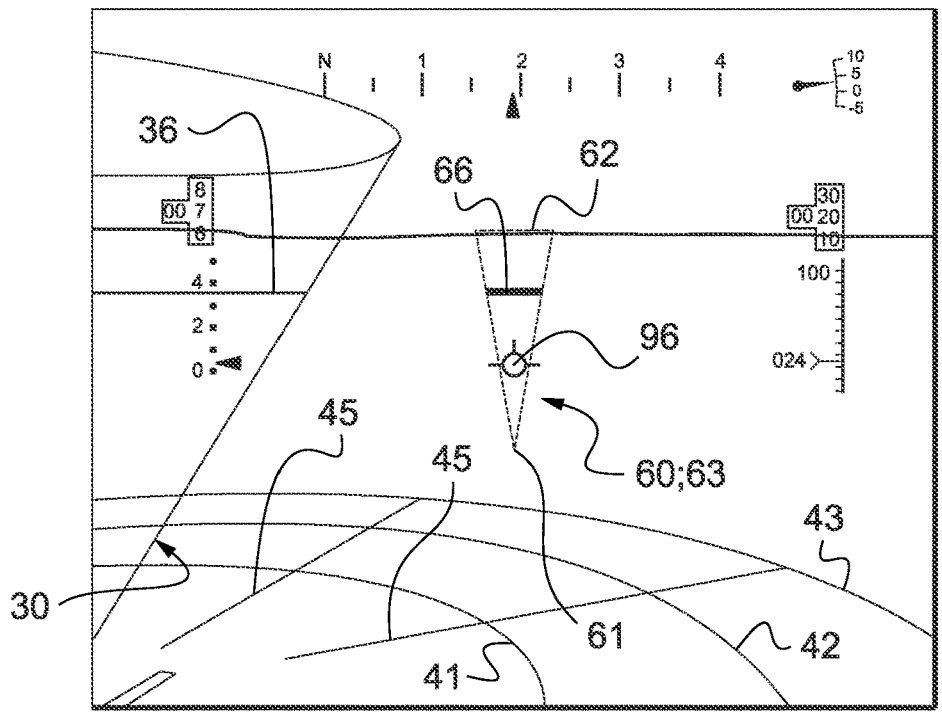

With reference to FIG. 9, when the bottom zone of the three-dimensional main symbol 30 no longer appears in the field of view 110, and at least when the aircraft 1 is situated at a distance from the landing point 101 that is less than a second threshold distance D2, the calculation means calculate the shape and the location of a three-dimensional secondary symbol 60 and transmit a signal to the screen in order to display the three-dimensional secondary symbol 60 on the sighting axis, the symbol being marked using dashed lines ---, and always being displayed on the pilot's visual axis. The secondary symbol appears only when the primary symbol has disappeared.

By way of example, the second threshold distance D2 may be a stored constant distance, a distance that is a function of the dimensions of the rotor disk of a rotorcraft, the distance between the landing point and the furthest main line . . . .

The three-dimensional secondary symbol 60 may have the same shape as the three-dimensional main symbol 30, i.e. a conical shape in the example described.

Nevertheless, the three-dimensional secondary symbol 60 may have graphic appearance that is visually different from the graphic appearance of the three-dimensional main symbol 30. The three-dimensional secondary symbol 60 is displayed in compliance with a third graphic charter. By way of example, the third graphic charter may consist in using fine discontinuous lines only.

Furthermore, the three-dimensional secondary symbol 60 presents a mark 66 that is movable as a function of the height of the aircraft 1. However this movable mark may be displayed using the same graphic charter as the height mark in order to avoid confusing the pilot.

Whenever the aircraft is offset relative to the landing point, the three-dimensional secondary symbol 60 continues to provide information both about, relative attitude and also about altitude regardless of the conditions of external visibility.

The pilot controls the aircraft as desired as a function of the position of the aircraft relative to the landing point shown by means of the various symbols.

In addition, the movement symbol 96 reappears as soon as the air speed vector becomes greater than a threshold.

Figure 10:
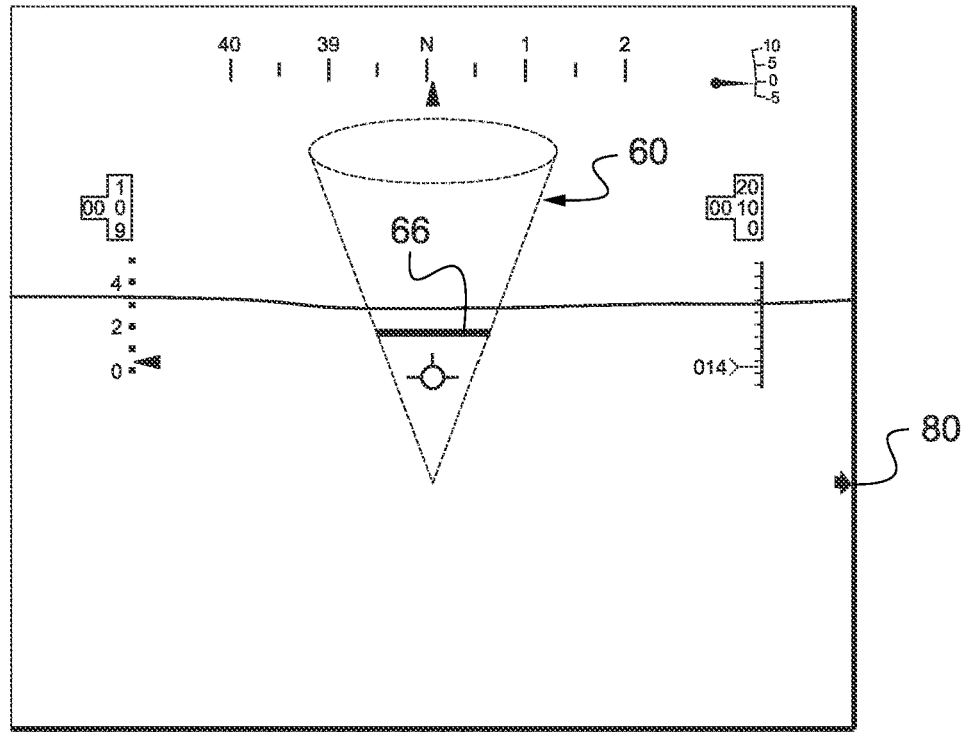

Furthermore, and with reference to FIG. 10, an arrow 80 is calculated and appears when each main symbol 30, 41, 42, 43, and 45 does not appear in the field of view 110. The arrow 80 and possibly the three-dimensional secondary symbol 60 may be displayed so long as the aircraft is situated at a distance away from the landing point that is less than some maximum distance, e.g. equal to the first threshold distance D1, or as soon as the pilot has decided to stop the approach.

Figure 11:
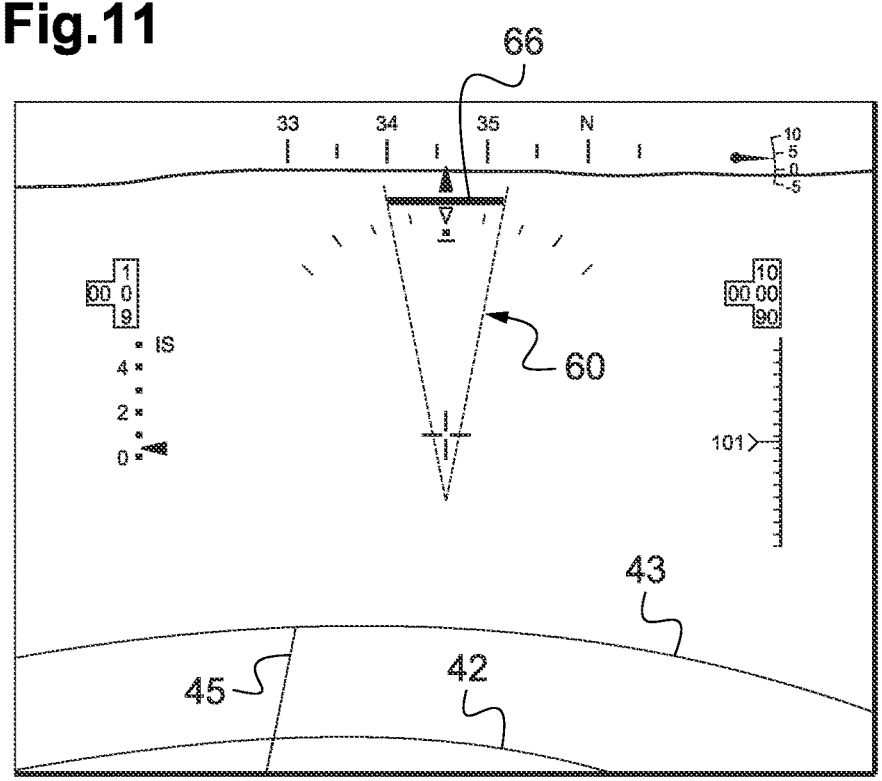

With reference to FIG. 11, when the aircraft is above the target zone but at a relatively great height, at least some of the main symbols no longer appear in the field of view.

Figure 12:
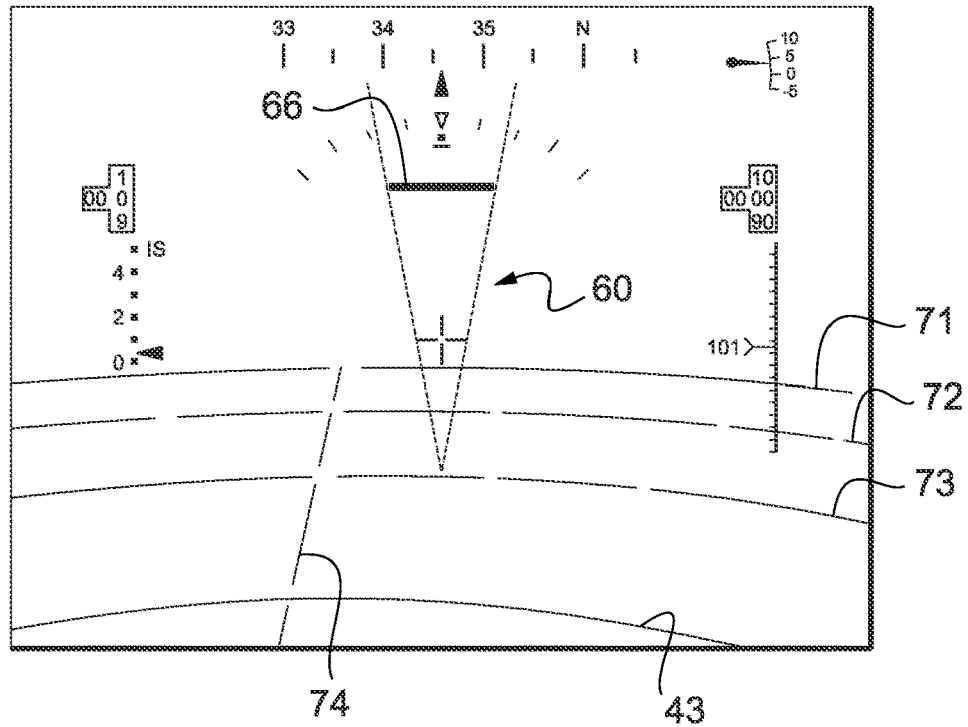

With reference to FIG. 12, when each main symbol 30, 41, 42, 43, and 45 no longer appears in the field of view 110, and at least when the aircraft 1 is situated at a distance from the landing point 101 that is less than a second threshold distance D2, the aircraft is then located above the target zone, but at a high altitude.

In order to assist, the pilot in knowing where the aircraft is located in the presence of degraded visibility, the onboard calculation means calculate the locations of at least three closed secondary lines 71, 72, 73 that are centered on the landing point 101, and the location of at least one secondary segment 74, and they transmit a signal to the screen in order to display each of the portions of the symbols that are visible in the field of view.

The secondary lines and the secondary segments may be displayed in compliance with a fourth graphic charter so as to present a graphic appearance that is visually different from the graphic appearances respectively of the main lines and of the main segments.

By way of example, the secondary lines 71, 72, and 73 are positioned at ground altitude around the main lines 41, 42, and 43 and at predetermined distances from the landing point. Each secondary segment 74 converges on the landing point 101.

Figure 13:
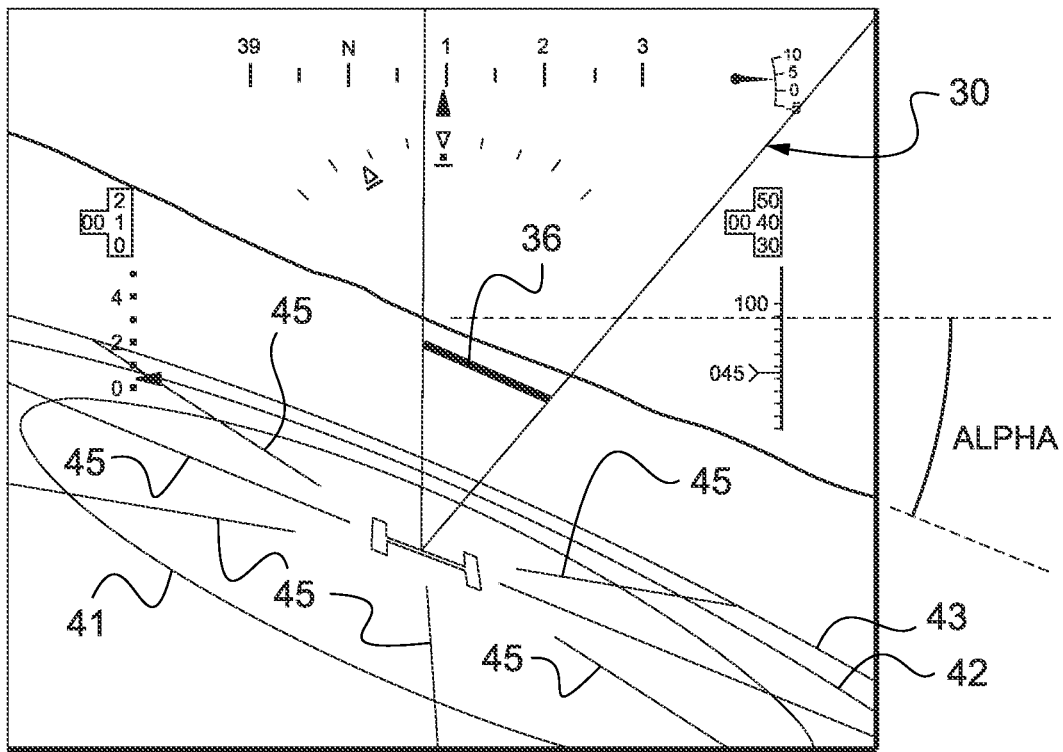
Figure 14:
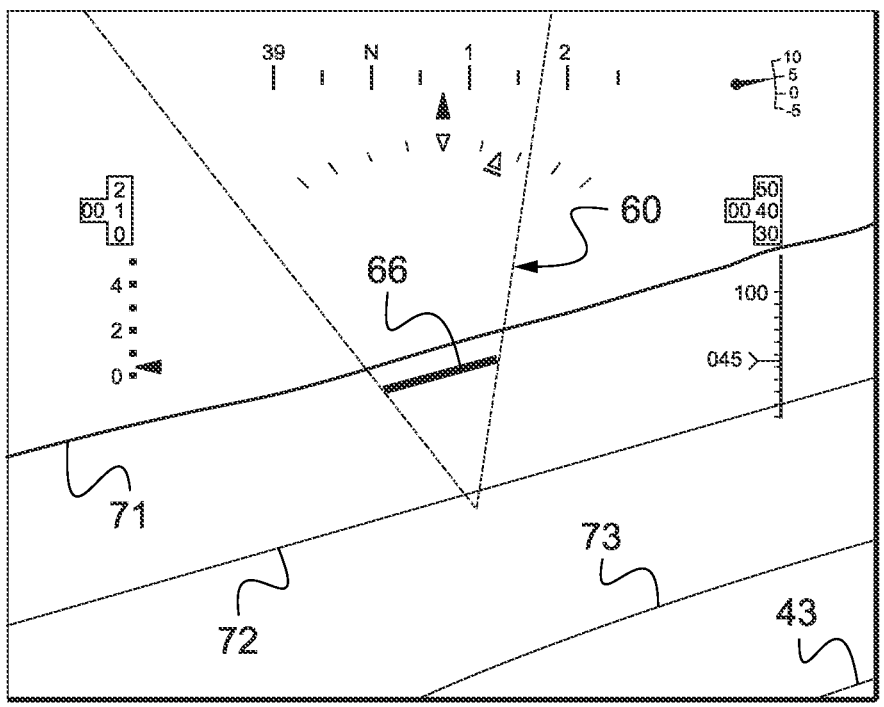

In another aspect, FIGS. 13 and 14 show the fact that the height mark of the movable mark 66 enable a pilot to evaluate a roll angle ALPHA of the aircraft 1, since these marks ought to be horizontal when the aircraft is flying level, for example.

Naturally, the invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A piloting assistance method for landing on a target zone with an aircraft, wherein the method comprises the steps of:
   designating a landing point;
   determining a sighting axis with onboard calculation means;
   displaying at least one part of a single three-dimensional main symbol on a screen overlaid on the real world or on a representation of the real world and in a field of view directed along the sighting axis, the three-dimensional main symbol providing a conformal position of the landing point so long as the at least one part of it is in the field of view, the three-dimensional main symbol extending in elevation upwards from the ground from a bottom zone positioned on the ground up to a top zone positioned at a top height relative to the ground; and
   at least when the aircraft is situated at a distance from the landing point that is less than a first threshold distance, displaying on the screen the at least one part of at least one two-dimensional main symbol so long as the at least one part of it is in the field of view, the at least one two-dimensional main symbol covering the target zone, wherein for a given period of time the aircraft is situated at a distance from the landing point that is less than the first threshold distance.

2. The method according to claim 1, wherein the method includes a step of determining a line of sight of a pilot of the aircraft by means of a posture detector, the sighting axis coinciding with the line of sight.

3. The method according to claim 1, wherein the three-dimensional main symbol comprises an upside-down cone, the main cone extending upwards from a tip of the main cone forming the bottom zone up to a base forming the top zone.

4. The method according to claim 1, wherein the top height is equal to a predetermined height or to the height of the aircraft at the time the landing point is designated.

5. The method according to claim 1, wherein the at least one two-dimensional main symbol comprises at least three closed main lines that are nested in one another, the at least three main lines each being centered on the landing point and being positioned at ground altitude, the at least one two-dimensional main symbol including at least four main segments converging on the landing point.

6. The method according to claim 5, wherein each main segment extends from a first end to a second end, the first end being positioned on the sole main line that is not surrounded by another main line, the second end not reaching the landing point, a two-dimensional main symbol having a central shape that is positioned on the landing point between the second ends of the main segments.

7. The method according to claim 6, wherein the central shape is H-shaped, being positioned at the landing point and being oriented along an arrival axis determined by the onboard calculation means.

8. The method according to claim 1, wherein, at all times, the three-dimensional main symbol includes a height mark that is movable as a function of the current height of the aircraft, the height mark being positioned at the current height of the aircraft between the bottom zone and the top zone so long as the current height of the aircraft is less than the top height, the height mark being positioned at the level of the top zone of the three-dimensional main symbol so long as the aircraft is at a height that is greater than or equal to the top height.

9. The method according to claim 1, wherein when the bottom zone of the three-dimensional main symbol no longer appears in the field of view and at least when the aircraft is situated at a distance from the landing point that is less than a second threshold distance, the method includes a step of displaying a three-dimensional secondary symbol on the screen and on the sighting axis, which three-dimensional secondary symbol is not overlaid on the landing point and extends upwards from the ground with a graphic appearance that is visually different from the graphic appearance of the three-dimensional main symbol, the three-dimensional secondary symbol presenting a mark that is movable as a function of the current height of the aircraft.

10. The method according to claim 1, wherein when each main symbol no longer appears in the field of view and at least when the aircraft is situated at a distance from the landing point that is less than a second threshold distance, the second threshold distance being less than the first threshold distance, the method includes a step of displaying at least one section of at least three closed secondary lines centered on the landing point and at least one secondary segment with a graphic appearance that is visually different from the graphic appearances respectively of the main lines and of the main segments of the at least one two-dimensional main symbol, the at least three secondary lines being positioned at ground altitude around the main lines of each secondary segment converging on the landing point.

11. The method according to claim 1, wherein when each main symbol does not appear in the field of view, the method includes a step of displaying an arrow on the screen, the arrow pointing towards the landing point.

12. The method according to claim 1, wherein the method includes a step of displaying at least one mark illustrating a roll angle of the aircraft, the mark being in a predetermined position when the aircraft is not banked.

13. The method according to claim 11, wherein the method comprises the steps of:
using the onboard calculation means to determine an approach slope directed towards the landing point or the top zone of the three-dimensional main symbol; and
displaying each section present in the field of view of at least two passing gates, each centered on the slope and each representing a gate through which the aircraft can pass in order to reach the landing point by following the slope, each gate being tangential to a cylinder centered on the landing point, the gate among the at least two passing gates that is tangential to the first cylinder encountered on going from the aircraft towards the landing point being an active gate, and the other gates among the at least two passing gates being inactive gates, the active gate having a visual appearance that is different from the inactive gates.

14. The method according to claim 11, wherein the method includes a step of displaying a movement symbol on the screen so long as the aircraft presents an air speed greater than a predetermined threshold, the movement symbol representing the speed vector of the aircraft.

15. An aircraft having a screen and onboard calculation means, wherein the onboard calculation means are configured to apply the method according to claim 1.

16. The method according to claim 1, wherein designating a landing point includes involves using a position designator.

17. The method according to claim 1, wherein the calculation means determines the sighting axis to coincide with a line of sight of a pilot of the aircraft, the line of sight of the pilot of the aircraft being detected by a posture detector onboard the aircraft.

18. The method according to claim 1, wherein the screen is a heads-up display.

\* \* \* \* \*